United States Patent
Byner et al.

(10) Patent No.: US 12,377,539 B2
(45) Date of Patent: Aug. 5, 2025

(54) COLLABORATIVE ROBOT

(71) Applicant: ABB Schweiz AG, Baden (CH)

(72) Inventors: Christoph Byner, Mannheim (DE);
Björn Matthias, Bad Schönborn (DE);
Harald Staab, Neckargemünd (DE);
Richard Roberts, Gilching (DE)

(73) Assignee: ABB Schweiz AG, Baden (CH)

( * ) Notice: Subject to any disclaimer, the term of this patent is extended or adjusted under 35 U.S.C. 154(b) by 111 days.

(21) Appl. No.: 18/083,687

(22) Filed: Dec. 19, 2022

(65) Prior Publication Data
US 2023/0138217 A1 May 4, 2023

Related U.S. Application Data

(63) Continuation of application No. PCT/EP2020/067973, filed on Jun. 25, 2020.

(51) Int. Cl.
*B25J 9/16* (2006.01)
*B25J 13/08* (2006.01)

(52) U.S. Cl.
CPC ........... *B25J 9/1638* (2013.01); *B25J 9/1602* (2013.01); *B25J 9/1664* (2013.01); *B25J 13/085* (2013.01)

(58) Field of Classification Search
CPC ...... B25J 9/1638; B25J 9/1602; B25J 9/1664; B25J 13/085
See application file for complete search history.

(56) References Cited

U.S. PATENT DOCUMENTS 11,246,618 B2 * 2/2022 Hall .................. A61B 17/1155

FOREIGN PATENT DOCUMENTS

| CN | 108772838 A | 11/2018 | |
|---|---|---|---|
| CN | 109219856 A | 1/2019 | |
| DE | 102008027008 B4 | 3/2016 | |
| DE | 102016001643 B4 | 1/2019 | |
| JP | 2015157352 A * | 9/2015 | ............ B25J 9/1676 |

OTHER PUBLICATIONS

WIPO English translation of JP-2015157352-A (Year: 2015).*
European Patent Office, International Search Report in International Patent Application No. PCT/EP2020/067973, 4 pp. (Mar. 23, 2021).
European Patent Office, Written Opinion in International Patent Application No. PCT/EP2020/067973, 8 pp. (Mar. 23, 2021).

(Continued)

*Primary Examiner* — Thomas E Worden
*Assistant Examiner* — Christopher A Buksa
(74) *Attorney, Agent, or Firm* — Leydig, Voit & Mayer, Ltd.

(57) ABSTRACT

A robot comprises at least one articulate arm having members including a base, an end effector and a plurality of links, wherein each link is movably connected to two others of said members by respective joints, at least one sensor for detecting an external force acting on any one of the members, and a controller for controlling movements of the joints, so as to move the end effector along a pre-programmed path. In case of the sensor detecting an external force, the controller is adapted to adopt a first release strategy for escaping from the external force, to evaluate whether the first strategy is successful, and if not, to adopt a second release strategy.

17 Claims, 2 Drawing Sheets

(56) References Cited

OTHER PUBLICATIONS

Figure 1:
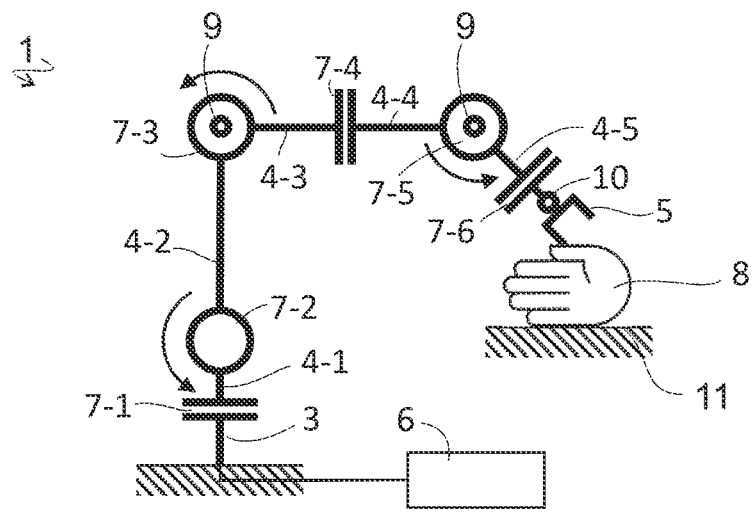

De Luca et al., "Collision Detection and Safe Reaction with the DLR-III Lightweight Manipulator Arm," *2006 IEEE/RSJ International Conference on Intelligent Robots and Systems*, IEEE, 1623-1630 (Oct. 9-15, 2006).

Haddadin et al., "Collision Detection and Reaction: A Contribution to Safe Physical Human-Robot Interaction," *2008 IEEE/RSJ International Conference on Intelligent Robots and Systems*, IEEE, 3356-3363 (Sep. 22-26, 2008).

The Patent Office of the People's Republic of China, Office Action in Chinese Patent Application No. 202080099663.7, 13 pp. (Dec. 16, 2024).

\* cited by examiner

COLLABORATIVE ROBOT

CROSS-REFERENCE TO RELATED APPLICATIONS

This patent application claims priority to International Patent Application No. PCT/EP2020/067973, filed on Jun. 25, 2020, which is incorporated herein in its entirety by reference.

FIELD OF THE DISCLOSURE

The present disclosure relates to industrial robots for collaborative applications.

BACKGROUND OF THE INVENTION

Collaborative robots are designed to be used in close vicinity to persons, so that contact between robot and person cannot always be avoided or may even be necessary for accomplishing a given task. Such contact can be constrained or unconstrained. A contact is referred to as unconstrained if the human body part involved is free to move away from the contact and as constrained if it isn't. Further, contact can be transient or quasi-static. Transient means that dynamic forces dominate and the robot impacts the human body part at an appreciable speed. Transient contact can be unconstrained or constrained. Quasi-static means that driving forces dominate and dynamic forces are negligible.

It is essential that contact between a person and a robot can take place without risk of injury for the person. This can be done by limiting the speed of an arm of the robot, so that the energy transferred in a possible contact with a person is safely below a potentially harmful level, and, in case of contact being detected, stopping the motion of the robot or, possibly, modifying it in such a way that the contact is released.

BRIEF SUMMARY OF THE INVENTION

The present disclosure relates to a robot which is adapted to release such a contact, if it occurs, with a minimum degree of discomfort for the person.

To this effect, the disclosure provides a robot comprising at least one articulate arm having for members a base, an end effector and a plurality of links, wherein each link is movably connected to two others of said members by respective joints, the robot further comprising at least one sensor for detecting an external force acting on any one of the members, and a controller for controlling movements of connected members with respect to one another, so as to move the end effector along a pre-programmed path, wherein in case of the sensor detecting an external force, i.e., a force caused by an object outside the system, and which is in particular not caused by weight and inertia of the robot itself, the controller is adapted to adopt a first release strategy for escaping from the external force along a first release path, to evaluate whether the first strategy is successful, and if not, to adopt a second release strategy along a second release path different from the first. In that way, an unintentional contact between the robot and the person can be released with a minimum risk of discomfort and with a minimal probability of intervention by another person becoming necessary, even if some malfunction should prevent movement along the first release path.

BRIEF DESCRIPTION OF THE SEVERAL VIEWS OF THE DRAWING(S)

Figure 2:
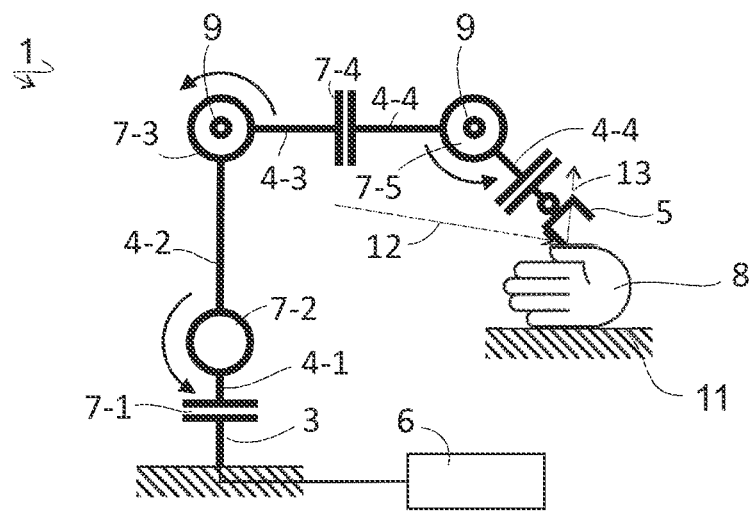
Figure 3:
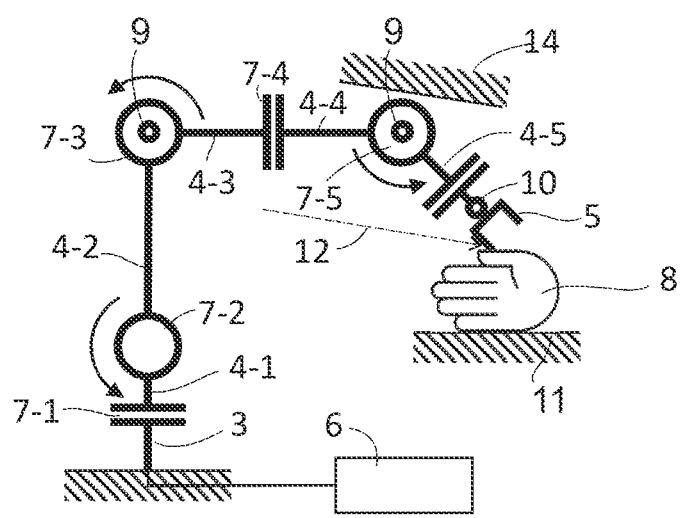

FIG. 1 is a diagram of a robot according to the disclosure.
FIG. 2 illustrates a first release strategy of the robot.
FIG. 3 illustrates a second release strategy.

DETAILED DESCRIPTION OF THE INVENTION

FIG. 1 schematically illustrates a robot 1 and a working environment in which it is installed. The robot 1 has an articulated arm of conventional design, comprising a base 3, an end effector 5 and a plurality of links 4-1, 4-2, . . . connected to each other, to the base 3 and to the end effector 5 by revolute or prismatic joints, and a controller 6 for controlling movements of the arm, i.e. of end effector 5 relative to base 3. For the sake of simplicity, only revolute joints 7-1 to 7-6 are shown in FIG. 1 and will be discussed in the description. Joints 7-1, 7-4 and 7-6 have axes of rotation that extend in the longitudinal direction of the adjacent links; joints 7-2, 7-3 and 7-5 have axes extending in a transverse direction.

A person's body part 8 is shown trapped between the end effector 5 and a surface 11 of the working environment, which causes an external force to be acting on the end effector. According to a first embodiment a sensor 10 for detecting the external force vector is provided in the end effector 5 itself.

According to an alternative embodiment, each joint 7-1 to 7-6 has a sensor 9 associated to it for detecting a torque in the direction of its respective axis of rotation. The sensor may be a force-sensitive member such as a piezo element connected to the two links that meet in the joint, or it may be formed by circuitry for measuring a current flowing in a motor driving the relative rotation of said links, which current is also representative of the torque to which the motor is subject. The torque measured by every such sensor can be regarded as a sum of two contributions. The first contribution is a function of the weight and the pose of the members of the robot on a distal side of the joint, and of possible inertial forces acting on these, the second is the effect of the contact with the body part 8. Since weights, speeds and poses of all these distal components are known to the controller, the first contribution can be estimated. If this calculated contribution differs significantly from the torque detected by the sensor 9, it may be concluded that there is an external force acting on the robot 1. From the measured torque and the calculated first contribution in each joint, the second contribution can be estimated, and from the estimated second contribution in each joint and the position of the end effector 5 relative to the axes of the joints, the external force vector can be calculated.

According to a third embodiment, both sensors 9, 10 are provided. In that case, if there is a discrepancy between the external force detected by sensor 10 and the one calculated from the data of sensors 9, it can be decided that the external force is acting not on the end effector but on a more proximal member of the robot. Implications of such a finding on possible release strategies will be discussed later on.

In FIG. 2 it is assumed that the end effector 5 has come into contact with body part 8 by grazingly approaching surface 11 along a path 12. While in many cases it is appropriate that the end effector 5, after detecting an external force indicative of contact with a person, should move back along the same path 12 but in the opposite direction, this may not be the case here. If the end effector 5 has already scratched the person's skin on its way to the position shown, the scratching shouldn't be repeated on the way back. The controller 6 avoids the risk by estimating, as described above, the direction of the external force applied to the end effector 5 by the body part 8, and then controlling the robot to move the end effector in the direction of this force. If the person's skin is still under shear stress from the advance of the end effector, this direction may be roughly coincident with the path 12; on the other hand, if the skin has slipped, and is not so much under shear stress but under pressure, then the path 13 of the release movement will roughly coincide with a surface normal of the body part 8. Even if the person should involuntarily try to withdraw the body part 8, the resulting external force will be detected and will cause the controller to move the end effector 5 along with the withdrawing body part 8, thus releasing it while avoiding scratching.

In an alternative embodiment of the disclosure the controller 6 is provided with data on the coordinates of surfaces such as 11 in the working environment of the robot. Based on this information and on past and current poses of the robot, the controller 6 judges which surface the robot is approaching and at which angle. If the angle of approach is close to the normal of the surface when an external force indicative of a contact is detected, then the robot can be controlled to release the contact by simply reversing its direction of motion and thus moving backwards, away from the surface, along the way it came, without detecting the direction of the external force. On the other hand, when the angle is so large that there is a possibility of scratching, it is worthwhile to release the contact by backing off in the direction of the external force.

FIG. 3 illustrates a case where a further surface 14 limits the mobility of the robot 1. Due to the existence of this surface 14, the pose in which the robot is shown can only be reached by moving the end effector 5 more or less along path 12. The release movement described with respect to FIG. 2 would here cause joint 7-5 of the robot to abut against surface 14. In the first embodiment described above, there is no sensor to detect such a contact; all the controller 6 would notice would be that the external force detected by sensor 10 doesn't decrease as it should, and possibly, from position sensors at the joints 7-1 to 7-6, that the angles of joints 7-1 and 7-3 do not change as should be expected if the robot 1 carried out correctly the commands from controller 6. So, after a short time, the controller 6 judges that the first release strategy of withdrawing the end effector 5 from the surface 11 along the direction of the external force is unsuccessful. Depending on the power of the motors driving the members of the robot 1, a few milliseconds or tens of milliseconds may be sufficient for such a judgment.

If the first release strategy is found to fail, controller 6 switches to a second release strategy. This second strategy can be to withdraw the end effector 5 by the path 12 along which it came.

Alternatively, the controller adopts a strategy of moving the robot 1 joint by joint: According to the first embodiment, the controller judges based on the known pose of the robot 1 and the force vector provided by sensor 10 which joint might be rotated to release the external force, and in which direction. An attempt to rotate joint 7-2, turning counterclockwise all robot members distal therefrom could be expected to release the external force, but fails to do so due to surface 14 blocking joint 7-5. The same holds for joint 7-3. When controller 6 selects joint 7-5, rotating link 4-5, joint 7-6 and end effector 5 counterclockwise, the contact is successfully released.

According to the second embodiment, when the external force acting on the end effector was first detected, the controller 6 has determined from the external torques at joints 7-2, 7-3 and 7-5 the direction in which these should be rotated in order to release the contact. The external torque (or rather, the component of the external torque parallel to the axis of rotation of the joint) being largest in joints 7-2, 7-3, the controller 6 first selects one of these and controls it to rotate counterclockwise. Normally, this should immediately release the contact. In the present case it doesn't, due to surface 14 blocking the rotation. Controller 6, upon detecting that controlling joints 7-2, 7-3 to rotate CCW doesn't release the torque detected in joint 7-5, switches to joint 7-5, and by rotating it counterclockwise, successfully releases the contact.

If the controller selects the joint to be rotated based on the torque weighted by the moment of inertia of members distal of the joint, the first joint to be selected can be joint 7-5, since the only member distal of it is the end effector 5, and the moment of inertia is likely to be small. Although the angle by which joint 7-5 has to be rotated in order to release the contact is larger than it would be for a link at a greater distance, the low inertia allows for a faster rotation of link 7-5, so that rotating link 7-5 may be the fastest way to release the contact.

It should be noted that the embodiments according to the present disclosure can deal not only with the end effector 5 but also with other moveable members of the robot touching body part 8. In fact, if some intermediate link of the robot arm makes contact with body part 8, this intermediate link and all members distal of it can be regarded as the above end effector 5, and the strategies described above can be applied to it.

REFERENCE NUMERALS

1 robot
3 base
4-1 link
5 end effector
6 controller
7-1 joint
8 body part
9 sensor
10 sensor
11 surface
12 path
13 path
14 surface One strategy for releasing a contact may depend on characteristics of the environment in which the robot is operating, for example of a surface against which a body part of the person might be pressed by the robot. Since pinching between a given surface and the robot is possible only if part of the robot is close enough to the surface, it can be advantageous to take into account the current pose of the robot when choosing a release strategy.

When an external force is detected that suggests that a contact has taken place, one practical release strategy is to control the robot so as to move the end effector along the path it has been following before the contact but in a reverse direction. This strategy has an advantage in that, as long as objects in the environment of the robot do not move, the path is certain to be free from obstacles, and in that calculation effort for controlling the release movement is small, so that the release movement can be started with minimal delay.

However, the release movement according to the above strategy may not be the most efficient one to actually release the contact between the robot and the person. In order to release the contact along the shortest possible path, and, hence, also in the shortest possible time, another strategy is to detect the direction of the external force acting on one of the members of the robot, and to control a displacement of said one member along the detected direction. Again, this strategy may not always be optimal; if the controller is provided with data on its environment, it may recognize that the movement in the direction of the contact force would cause the robot to touch some obstacle, which would make the first-mentioned strategy appear preferable. If the controller is not provided with such data, and contact with an obstacle occurs, moving away from that contact in the direction of the contact force might again put the person in danger. Evidently, in such a case, changing the release strategy is useful to move the robot in a way in which the person is released quickly and persistently.

Moving back the robot along the incident path can be impossible if the person, on being touched by the robot, has moved into a position blocking the path, or if a technical failure prevents a backward movement in one of the joints of the robot. In that case, as a further release strategy, it can be appropriate for the controller to select one of the joints of the robot and to set the relative movement of the two members connected by said joint in a direction yielding to said load. If controlling the movement of this joint is insufficient to remove the external force, e.g. because the selected joint happens to be the one affected by the failure and cannot move in spite of being controlled to do so, or because its displacement range is insufficient, another joint can be selected, and the procedure can be repeated for this other joint.

If the controller is adapted to compare outside loads acting on different joints, it should preferably first select the joint whose external load is highest, since this is also the joint where the smallest amount of displacement is likely to release the contact.

The load can be the force transmitted from one link to another via the connecting joint, the torque acting on the joint, or the torque weighted by the moment of inertia of the members of the robot arm on the distal side of the joint. If the joint is a revolute joint, the load can also be a component of the above torque or ratio in the direction of the joint axis.

Whenever it is decided that the robot's strategies for releasing the contact do not succeed, a possible option is a so-called protective stop in which not only the robot is halted, but drive power is also removed, to prevent any further hazards from occurring.

A protective stop can be an appropriate strategy in particular in the above-mentioned case of the release movement of the robot being blocked by an obstacle.

At the border of the working range of the robot there are points that the end effector can reach only by assuming a singular pose, in which links of the robot that are connected by a rotatable joint are arranged in a straight line. In such a singular pose, an external force acting along the straight line will not cause torque in the connecting joint, which implies that the force which the robot might apply to a person in such a singular pose cannot be controlled. Therefore, the controller should be adapted to prohibit the robot arm from assuming a singular pose.

The present disclosure further describes a method of controlling a robot, comprising the steps of: detecting whether an external force is acting on the robot; and, in the affirmative, adopting a first release strategy for escaping from the external force, evaluating whether the first strategy is successful, and if not, adopting a second release strategy, and to a data carrier storing computer-readable instructions which, if read and executed by a computer, cause the computer to operate as the controller in the robot described above or to carry out the above method.

Further features and advantages of the invention will become apparent from the following description of embodiments thereof, referring to the appended drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A robot, comprising:
at least one articulate arm having members, the members comprising a base, an end effector, and a plurality of links, wherein each of the plurality of links is movably connected to two other members by respective joints;
at least one sensor configured to detect an external force acting on any one of the members; and a controller configured to control movements of the respective joints so as to move the end effector along a pre-programmed path;

wherein, in response to the sensor detecting the external force, the controller is configured to:

adopt a first release strategy for escaping from the external force, evaluate whether the first strategy is successful;

adopt a second release strategy when the first strategy is unsuccessful; and prohibit the robot arm from assuming a singular pose that corresponds to the plurality of links being arranged in a straight line, wherein in the first or second release strategy the controller is further configured to select one of the respective joints and to control the one of the respective joints to rotate based on an external torque affecting the respective joints.

2. The robot of claim 1, wherein the controller is further configured to choose the first strategy from a first set of strategies depending on a current pose of the robot arm.

3. The robot of claim 1, wherein the second release strategy is chosen from a second set of strategies.

4. The robot of claim 3, wherein at least one of the second set of strategies includes a protective stop.

5. The robot of claim 1, wherein at least one of the first or second release strategies includes moving the end effector along a reverse direction.

6. The robot of claim 1, wherein the at least one sensor is configured to detect a direction of the external force, and, in the first or second release strategy, the controller is configured to control a displacement of the any one of the members on which the external force is acting along the detected direction.

7. The robot of claim 1, wherein in the first or second release strategy the controller is further configured to select one of the respective joints and to control the one of the respective joints to move in a direction yielding to the detected external force.

8. The robot of claim 7, wherein the controller is further configured to detect more than one additional external force acting on one or more of the respective joints, and select one of the respective joints onto which one of the external forces is highest.

9. The robot of claim 7, wherein the controller is further configured to select another one of the respective joints in response to the external force fails to be reduced.

10. A system comprising a robot, the robot comprising:

at least one articulate arm having members, the members comprising a base, an end effector, and a plurality of links, wherein each of the plurality of links is movably connected to two other members by respective joints;

at least one sensor configured to detect an external force acting on any one of the members; and a controller configured to control movements of the respective joints so as to move the end effector along a pre-programmed path, wherein the controller is configured to execute a method comprising the steps of:

detecting, based at least in part the at least one sensor, whether the external force is acting on the robot;

adopting a first release strategy for escaping from the external force when the external force is acting on the robot;

evaluating whether the first strategy is successful;

adopting a second release strategy when the first strategy is unsuccessful; and prohibiting the robot arm from assuming a singular pose that corresponds to the plurality of links being arranged in a straight line, wherein in the first or second release strategy the controller is further configured to select one of the respective joints and to control the one of the respective joints to rotate based on an external torque affecting the respective joints.

11. The system of claim 10, further comprising choosing the first release strategy from a first set of strategies depending on a current pose of the robot.

12. The system of claim 10, further comprising choosing the second release strategy from a second set of strategies.

13. The system of claim 12, wherein at least one of the second set of strategies includes a protective stop.

14. The system of claim 10, wherein at least one of the first or second release strategies includes moving the end effector along a reverse direction.

15. The system of claim 10, further comprising detecting a direction of the external force, and, in the first or second release strategy, displacing the robot along the detected direction.

16. The system of claim 10, further comprising move the robot in a direction yielding to the detected external force.

17. The system of claim 16, further comprising detecting more than one additional external force acting on the robot, and selecting a highest external force.

* * * * *